(12) United States Patent
Swan

(10) Patent No.: US 6,304,297 B1
(45) Date of Patent: Oct. 16, 2001

(54) METHOD AND APPARATUS FOR MANIPULATING DISPLAY OF UPDATE RATE

(75) Inventor: Philip L. Swan, Toronto (CA)

(73) Assignee: ATI Technologies, Inc., Thornhill (CA)

( * ) Notice: Subject to any disclaimer, the term of this patent is extended or adjusted under 35 U.S.C. 154(b) by 0 days.

(21) Appl. No.: 09/119,872

(22) Filed: Jul. 21, 1998

(51) Int. Cl.[7] .................................................. H04N 7/01
(52) U.S. Cl. .................. 348/556; 348/440.1; 348/439.1; 348/459; 345/132; 345/501
(58) Field of Search ..................... 348/459, 554, 348/445, 555, 441, 448, 518, 513, 510, 552, 607, 440.1, 439.1, 556, 558; 345/503, 501, 132, 213; H04N 7/01

(56) References Cited

U.S. PATENT DOCUMENTS

| | | | |
|---|---|---|---|
| 4,961,071 | * 10/1990 | Krooss ................................. 340/721 |
| 5,257,103 | * 10/1993 | Vogeley et al. ...................... 385/140 |
| 5,657,478 | * 8/1997 | Recker et al. ....................... 395/503 |
| 5,734,435 | * 3/1998 | Wilson et al. ....................... 348/459 |
| 5,767,987 | * 6/1998 | Wolff et al. ......................... 358/447 |
| 5,784,115 | * 7/1998 | Bozdagi .............................. 348/448 |
| 5,818,967 | * 10/1998 | Bhattacharjee et al. ............. 382/233 |
| 5,898,420 | * 4/1999 | Timm ................................... 345/134 |
| 5,977,836 | * 11/1999 | Swan et al. .......................... 345/213 |
| 5,977,989 | * 11/1999 | Lee et al. ............................ 345/503 |
| 6,028,586 | * 2/2000 | Swan et al. .......................... 345/132 |
| 6,064,393 | * 5/2000 | Lengyel et al. ...................... 345/427 |

* cited by examiner

*Primary Examiner*—Michael Lee
*Assistant Examiner*—Jean W. Désir
(74) *Attorney, Agent, or Firm*—Vedder, Price, Kaufman & Kammholz

(57) ABSTRACT

A method and apparatus for manipulating the display update rate of video signals to minimize the adverse visual effects caused by adding or deleting frames begins by determining a need value for manipulation of the display update rate. The need value corresponds to increasing drift between the display update rate and the refresh rate. As such, as the drift increases between the display update rate and the refresh rate, the need value increases correspondingly. Next, an appropriateness value for manipulation of the display update rate is determined based on image content. In essence, the appropriateness value is determining whether, if a frame addition or deletion were to occur, would it occur at a point that would produce minimal adverse visual effects. Based on a relationship between the need value and the appropriateness value, the display update rate is manipulated by adding or deleting a frame. The relationship generally provides that as the need value increases, the appropriateness value required decreases.

27 Claims, 5 Drawing Sheets

METHOD AND APPARATUS FOR MANIPULATING DISPLAY OF UPDATE RATE

TECHNICAL FIELD OF THE INVENTION

This invention relates generally to video graphics circuitry and more particularly to manipulating the display update rate of incoming video frames.

BACKGROUND OF THE INVENTION

Computers are known to include a central processing unit, system memory, audio processing circuitry, video graphics circuitry and peripheral ports. The peripheral ports allow the computer to interface with peripheral devices such as monitors, mouses, keyboards, printers, external memory devices, etc. The video graphics circuitry functions as a co-processor for the central processing unit such that it processes video and/or graphic images for display on a monitor.

As is known, the video graphics circuitry prepares frames of video images for display on the computer monitor. In general, the video graphics circuitry produces a frame's worth of video data at a rate that is dependent upon the refresh rate of the computer monitor. For example, if the refresh rate is 60 hertz, the video graphics circuitry must produce and store a frame of video data in a frame buffer once every 1/60th of a second. If the refresh rate of the computer monitor is 75 Hz, 90 Hz, or greater, the video graphics circuit must produce the frame of video data in even less time.

When the video graphics circuitry is preparing graphics images for display (e.g., images that have been generated in response to performing computer applications such as word processing applications, drawing applications, presentation applications, spreadsheet applications, video games, etc.), the rate at which the image data is received directly corresponds to the refresh rate of the computer monitor. For example, if the computer monitor refresh rate is 60 hertz, the display update rate (i.e., the rate at which the image data is received) of the graphics images is also 60 hertz. Thus there is no drift between the display update rate and the refresh rate.

When a computer is processing video data (e.g., television broadcast, satellite broadcast, cable broadcast, DVD images, VCR images, and/or motion picture images), the display update rate does not exactly match the display refresh rate. For example, television broadcasts may have a display update rate of 59.94 hertz. Thus, when displayed on a computer monitor, the images being displayed have a slightly longer period than the refresh rate of the computer monitor. As such, the differences in the frequencies will cause drift such that an overflow or underflow condition results in the frame buffer. When this occurs, a video frame must either be added or dropped from displaying on the computer monitor.

When a frame is added or deleted, it may be perceived by the viewer. For example, if a frame is added during an action scene (e.g., a basketball game), the viewer would notice a skip in the video do to the added or deleted frame. To overcome this problem, techniques have been developed to increase the synchronization between the display update rate of video images and the refresh rate of computer monitors. While these techniques have substantially reduced the need for adding or deleting frames, in many such applications the need still exists, albeit at a much less frequent rate. But, when a video frame is to be added or deleted, the above mentioned problem still exists.

Therefore, a need exists for a method and apparatus that provides for the adding and/or deleting of video frames during scenes that will not be perceived by most viewers.

DETAILED DESCRIPTION OF THE PREFERRED EMBODIMENT

Generally, the present invention provides a method and apparatus for manipulating the display update rate of video signals to minimize the adverse visual effects caused by adding or deleting frames. Such a process begins by determining a need value for manipulation of the display update rate. The need value corresponds to increasing drift between the display update rate and the refresh rate. As such, as the drift increases between the display update rate and the refresh rate, the need value increases correspondingly. Next, an appropriateness value for manipulation of the display update rate is determined based on image content. In essence, the appropriateness value is determining whether, if a frame addition or deletion were to occur, would it occur at a point that would produce minimal adverse visual effects. For example, if consecutive frames of video contained little or no motion, the addition or deletion of a frame in this sequence would be almost unperceivable, thus having a high appropriateness value. Also, the appropriateness value would be high for a scene change. Based on a relationship between the need value and the appropriateness value, the display update rate is manipulated by adding or deleting a frame. The relationship generally provides that as the need value increases, the level of the appropriateness value decreases. Conversely, when the need is low, a higher standard is set for the appropriateness value is high. With such a method and apparatus, the addition or deletion of frames to correct for drift between the display update rate and the refresh rate is done with minimal or no adverse visual effects.

Figure 1:
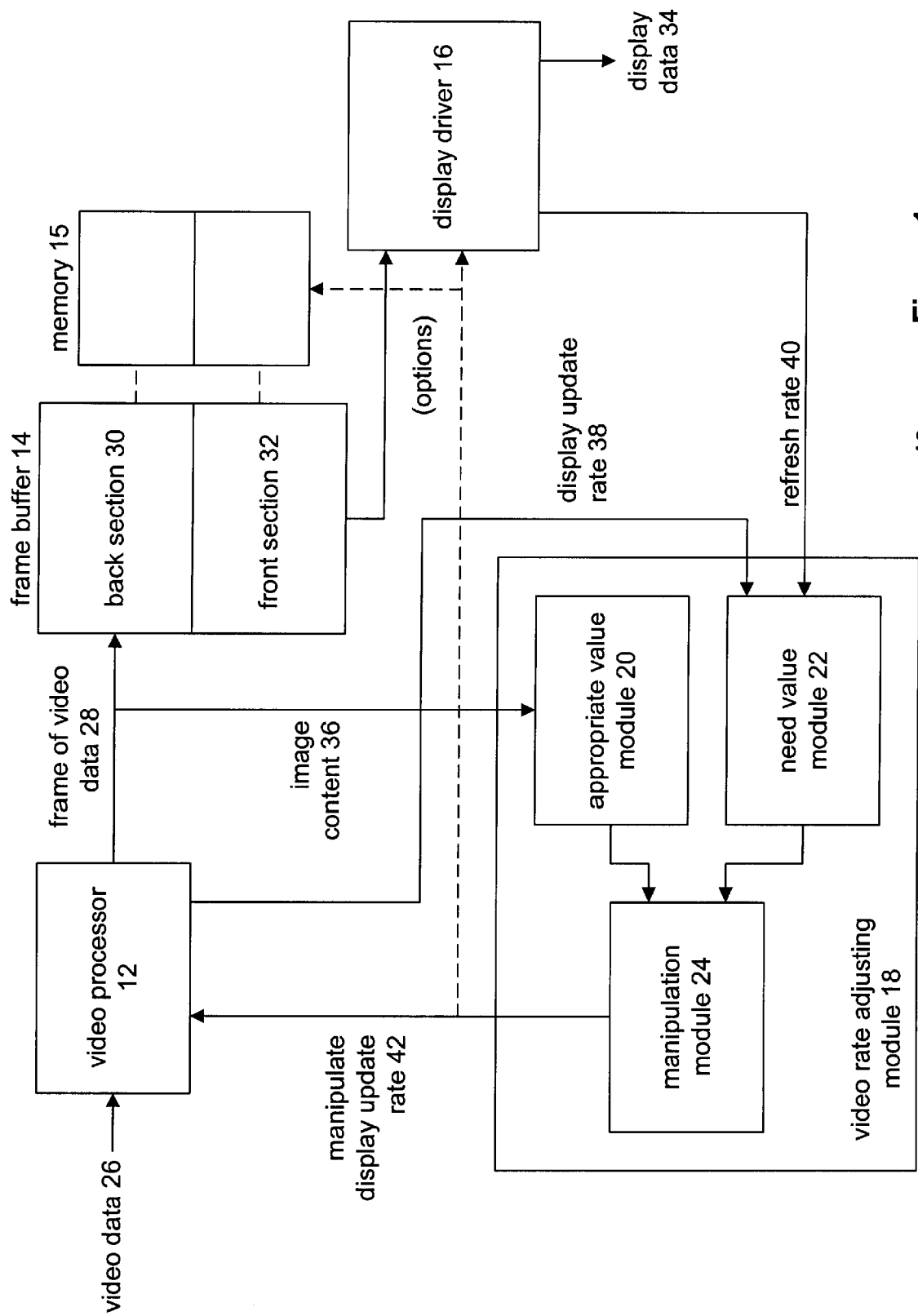
FIG. 1 illustrates a schematic block diagram of a video grapics circuit in accordance with the present invention.

The present invention can be more fully described with reference to FIGS. 1 through 6. FIG. 1 illustrates a schematic block diagram of a video graphics circuit 10 that includes a video processor 12, a frame buffer 14, additional memory 15, a display driver 16, and a video rate adjusting module 18. The video processor 12 is operably coupled to receive video data 26 and to convert the video data into frames of video data 28. The video processing module 12 may include a television decoder, such that the video graphics circuit 10 may receive video data 26 from television broadcast, satellite broadcast, cable broadcast, DVD players, VCR players, etc.

The video processor 12 causes a frame, or field, of video data 28 to be stored in the back section 30 of frame buffer 14. As a current frame/field of video data 28 is being written into the back section 30 of frame buffer 14, a previously stored frame/field of video data 28 is being read from a front section 32 of frame buffer 14 by the display driver 16. The frame buffer 14, by including a back section 30 and a front section 32, is utilizing a technique known as double buffering. As one of average skill in the art would readily appreciate, the frame buffer may include additional sections such that triple buffering or quadruple buffering techniques may be used. In addition, the frame buffer may include only a single section. Further, the frame buffer may incorporate buffering techniques that use an amount of memory for buffering of video data where the amount in a non-integer multiple of the size of a single frame.

If the display driver 16, which provides display data 34 to a computer monitor or similar device, is reading the data from the frame buffer 14 at exactly the same rate as the video processor 12 is writing the data into the frame buffer, there is no need to add or delete frames. In other words, the display driver 16 is reading the data from the frame buffer 14 at the refresh rate and the video processor 12 is writing the data at the display update rate, where the display update rate and the refresh rate match. When these rates match, the frame buffer 14 will not overflow or underflow, thus there will be no need to add or delete a frame. If, however, the refresh rate and the display update rate do not exactly match, drift will occur. When drift occurs, an overflow or underflow condition will eventually arise in the frame buffer 14. An overflow condition occurs when the video processor 12 is writing the frames of video data 28 into the frame buffer at a rate slightly faster than the display driver 16 is reading from the frame buffer. The underflow condition occurs when the display driver 16 is reading from the frame buffer 14 at a rate slightly faster than the video processor 12 is writing the frames of video data 28 into the frame buffer 14. As one of average skill in the art would appreciate, the display update rate and the refresh rate do not need to be in a one-to-one ratio. For example, the display update rate may be 24 hertz, while the refresh rate is 60 hertz thus producing a 2.5 to 1 ratio.

The video rate adjusting module 18 includes an appropriateness value module 20, a need value module 22, and a manipulation module 24. The appropriateness value module 20 is operably coupled to receive image content 36 of the frames of video data 28. Based on the image content 36, the appropriateness value module 20 is detecting a lack of motion between time related frames, or the likelihood of a scene change between the time related frames. Such a determination will be discussed in greater detail below with reference to FIG. 3. When the appropriateness value module 20 detects the likelihood of a scene change, or lack of motion, it provides a high appropriateness value to the manipulation module 24. Note that the appropriateness value may be a dynamic value that is scaled based on the degree of lack of motion or the degree of likelihood of a scene change. Alternatively, the appropriateness value may be a binary type value wherein if the lack of motion is below a certain threshold, the appropriateness value is set. Similarly, if the likelihood of a scene change is above a certain threshold, the appropriateness value would be set. The appropriateness value may be determined on a frame by frame basis or on a group of frames basis.

The need value module 22 is operably coupled to receive the display update rate 38 and the refresh rate 40. The display update rate 38 and refresh rate 40 may be directly obtained from the video processor 12 and the display driver 16, respectively, or may be obtained by monitoring the read and write rate into and out of the frame buffer 14. Based on the rates, 38 and 40, the need value module 22 generates a need value indicating the need for the addition or the dropping of a frame. The need value may be a dynamic scaling value based on the drift caused by discrepancies between the display update rate and the refresh rate or may be a binary type value that is set when the drift has reached a certain threshold.

The manipulation module 24 is operably coupled to receive the appropriateness value and the need value. Based on these inputs, the manipulation module 24 generates a manipulation display update rate signal 42. The rate signal 42 is provided to the video processor 12, and optionally to the display driver 16 and memory 15. As such, the manipulation module 24, may cause the video processor 12 to repeat the writing of a frame the back section 30 of the frame buffer, thereby repeating a frame, or may cause the video processor 12 to skip writing a frame thereby causing the video processor to drop a frame. Alternatively, or in addition, the manipulation display update rate signal 42 may be provided to the display driver 16 which causes it to read an additional frame from the front section 32 or to skip the reading of a frame thereby dropping a frame. As yet another alternative, the manipulate display update rate signal 42 may be provided to memory 15 which would allocate memory 15 to the frame buffer such that the back section 30 and the front section 32 have increased size thereby avoiding an overflow or underflow condition.

Figure 2:
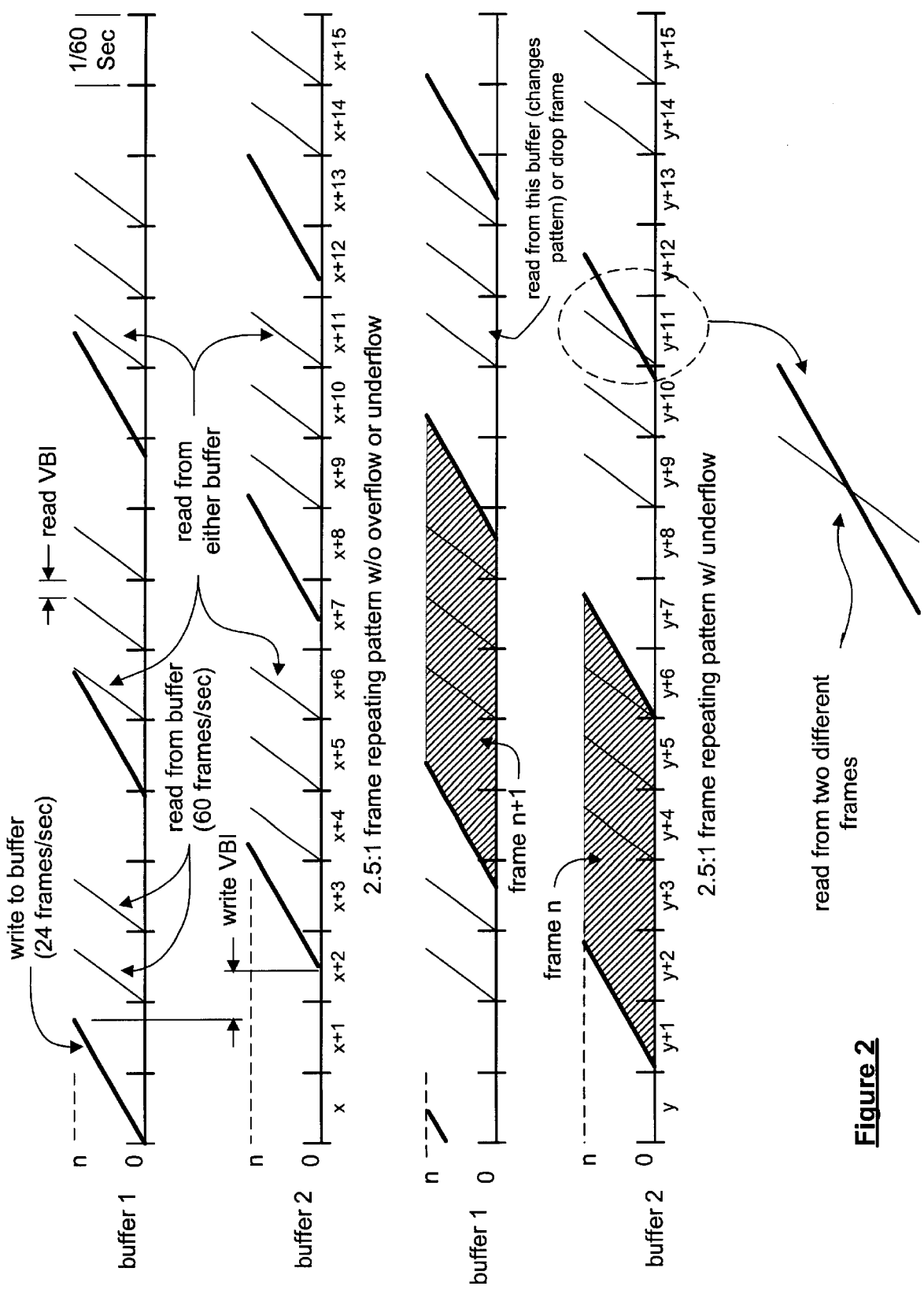
FIG. 2 illustrates a graphical representation of adding and/or deleting video frames in accordance with the present invention.

FIG. 2 illustrates a graphical representation of video data having a 24 frames per second display update rate being displayed on a monitor having a 60 frame per second refresh rate. The first timeline of FIG. 2 illustrates the reading and writing from a first buffer, which is the back section 30 when it is being written to and the front section 32 when it is being read from. The time increment is shown to be ⅟₆₀th of a second, where 16 cycles are represented in the time line. The slope of the write to buffer representation corresponds to the time it takes to write a frame of data into the buffer. The slope of the read from buffer representation corresponds to the time it takes to read a frame of data from the buffer. As shown, at least two reads from a buffer can occur between writes to the buffer. The second time line illustrates the reading and writing from the second buffer of frame buffer 14, which is functioning as the opposite buffer as represented by the first line (e.g., the first line is the back buffer, the second line is the front buffer and vice versa).

In this illustration, the frame buffer reads for display refresh cycles are represented by x, x+1 through x+15. At cycle x, the video data is being written into the first frame buffer. Due to the video update rate of 24 frames per second, it takes approximately two and one half display refresh cycles to write a frame of the video data into the frame buffer. Once a frame of data has been written into the frame buffer, at the next cycle, x+2, it may be read from the buffer. During this cycle, the next frame of video data is being written into the second frame buffer. Note that the difference, in time, between when the first frame of video data has been completely written into the first buffer and when the second frame of data begins being written into the second buffer corresponds to the write vertical blanking interval. Further note that the 0, along the vertical axis of the time line, represents that no data of a current frame of data has been written to, or read from, the buffer, while the n designation indicates that all, or almost all, of the data of the current frame has been written to, or read from, the buffer.

At time interval x+3, the video data stored in buffer 1 is again read and provided to the display driver 16. At cycle x+4, the second buffer contains sufficient data such that it's contents are read. Also during the end of this cycle, the first buffer is beginning to store the next frame of video data. At cycle x+5, the video data is again read from the second buffer while the first buffer is continuing to store the next frame of video data. At cycle x+6, the frame of video data is again read from the second buffer. Note that the first buffer contains a full-frame of video data such that if it were desired, the display driver 16 could have read a frame's worth of video data from the first buffer. But to maintain the 2.5 to 1 ratio, the illustration shows that two cycles will be read from buffer 1 and three cycles from buffer 2. The process continues from x+7 through x+15.

Note that the reading cycle includes a read vertical blanking interval which is shown at cycle x+7. Further note that the time difference between the display update rate and the refresh rate is not exactly a 2.5 to 1 ratio. This may be graphically seen by comparing, at cycles x+7 and x+11, the distance between the end of the read cycle with buffer 2 and the end of the write cycle in buffer 2. Comparing the difference between the end of the read cycle and write cycle in frame X+7 and the same data at cycle X+11, one can see that the write cycle is somewhat less than 2.5 times the read cycle. As such, eventually, a condition will arise where an underflow of the frame buffer will occur.

The third and fourth time lines represent the underflow condition. At cycle y+6 of the third and fourth time lines, the full read of frame n in buffer 2 occurs just prior to the writing of the next frame within frame buffer 2. As such, for cycles y+4, y+5, and y+6, the full three frames of video data are read. At cycle y+11, however, the next frame in the read process crosses the write process, i.e., if allowed, the read process would retrieve data from two different frames. At this point, the frame needs to be dropped or a frame should be read from the first buffer, both of which may be perceivable to the viewer if done at an inappropriate time. An appropriate time can occur when the difference between one frame to the next has little or no motion, or is related to a scene change. At these points, if a frame is added or deleted, it will not be perceivable to most viewers.

As one of average skill in the art would appreciate, the graphical representation of FIG. 2 may be adjusted wherein the write cycle is slightly larger than the 2.5 to 1 ratio such that an overflow condition would occur causing frames to be added, or the pattern to be switched. In either case, by utilizing the teachings of the present invention to determine when an appropriate time to make the display update rate change (i.e., add or drop a frame, or switch the reading pattern as shown in FIG. 2), a reduction in adverse visual effects is achieved. As one of average skill in the art would further appreciate, the teachings of the present invention are equally applicable to displaying images on television sets where the refresh rate of the television is different than the received input video display update rate. Further, the teachings of the present invention are of additional benefit when the television is displaying two channels at once and the television refresh rate is locked to one channel, which drifts with respect to the other channel.

Figure 3:
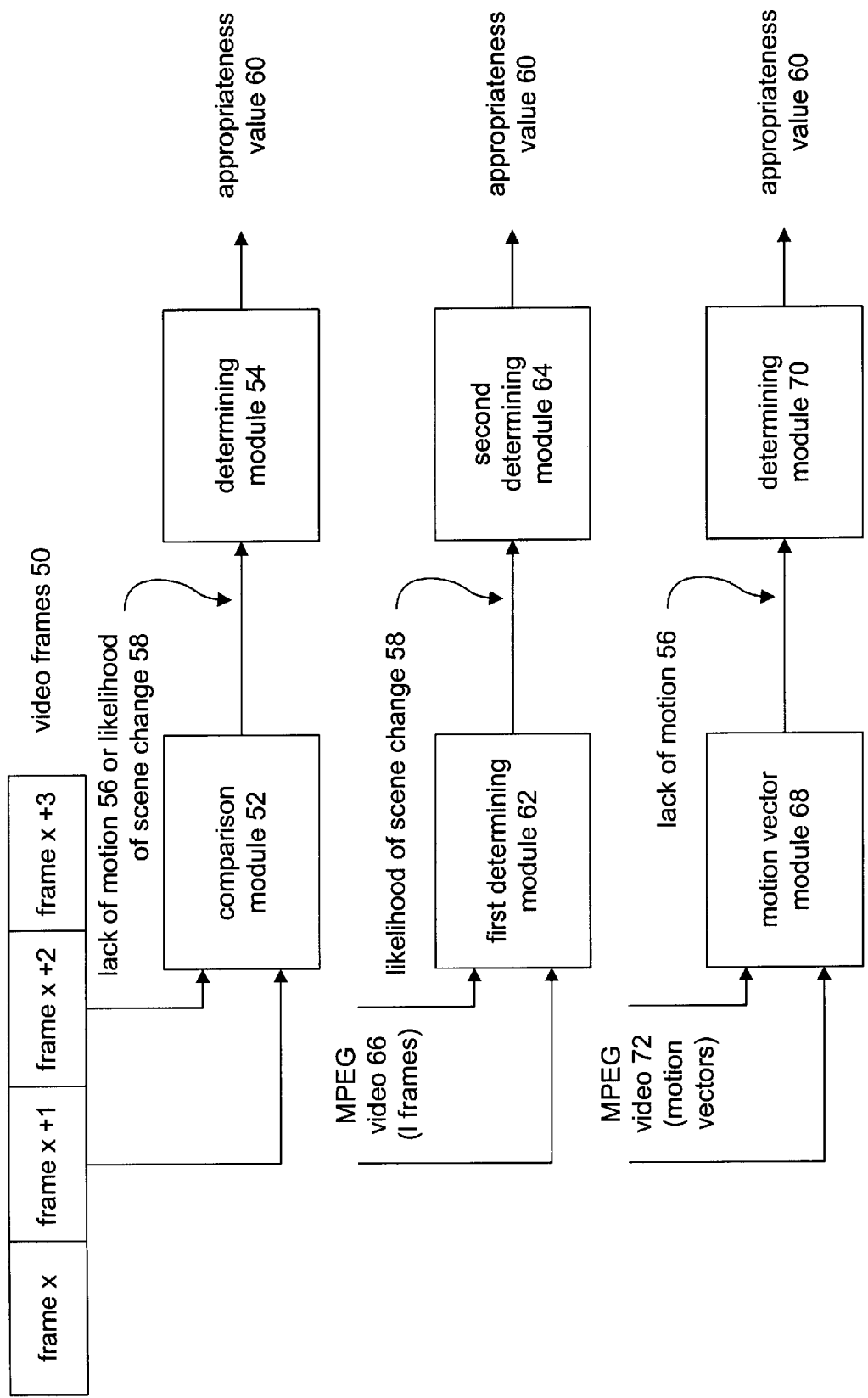
FIG. 3 illustrates schematic block diagrams of the appropriateness value module of FIG. 1.

FIG. 3 illustrates several schematic block diagrams of the appropriateness value module 20. The first circuit includes a comparison module 52 and a determining module 54. The comparison module is operably coupled to receive image content of at least two time related frames. As shown, a plurality of video frames 50 is shown in sequence to include frame x, frame x+1, frame x+2, and frame x+3. The comparison module receives frames x+1 and x+2 and determines whether there is a lack of motion 56 or a likelihood of scene change 58. The values 56 and 58 outputted by the comparison module 52 indicates the degree of lack of motion or the degree of likelihood of a scene change. Note that the comparison module 52 may perform the comparison utilizing a signature analysis technique.

The determining module 54 receives the lack of motion indication 56 and/or the likelihood of a scene change 58 and determines the appropriateness value 60 therefrom. The determining module 58 may provide the appropriateness value 60 as a binary type value, which indicates that the lack of motion was below a certain threshold or the likelihood of a scene change exceeded a certain threshold. When the appropriateness value is set, it indicates that a frame could be added or dropped with minimal adverse visual effects. Alternatively, the determining module 54 may provide a numerical representation of the lack of motion 56 or the likelihood of a scene change 58 that is used in conjunction with the need value to produce a non-linear relationship. The non-linear relationship between the need value and appropriateness value will be discussed in greater detail with reference to FIG. 5.

The next schematic block diagram of the appropriateness value module 20 includes a first determining module 62, a second determining module 64, a motion vector module 68, and a determining module 70. This embodiment of the appropriateness value module 20 is operably coupled to receive I frames 66 and motion vectors 72 of MPEG video frames. The first determining module 62 is operably coupled to receive I frames of the MPEG video sequence while the motion vector module 68 is operably coupled to receive motion vectors of the MPEG videos. The first determining module 62 detects when an I frame is not in a predetermined position. As is generally known, MPEG video includes I frames, B frames, and P frames. The I frames are independent frames that do not depend on the video content of the other frames. In a typical MPEG video pattern, an I frame is repeated once every sixteen frames. As such, when an I frame appears in a frame that is not within this designated pattern, the likelihood of a scene change 58 is relatively high. Based on this information, the second determining module 64 may generate the appropriateness value based on the likelihood of scene change.

The motion vector module 68 receives the motion vectors of time-related frames to determine the lack of motion 56. As is known within the MPEG requirements, the motion vectors generally indicate movement between consecutive frames. As such, when the motion vectors indicate the lack of motion, the motion vector module 68 provides such an indication to the determining module 70. From this information, the determining module 70 generates the appropriateness value 60.

Figure 4:
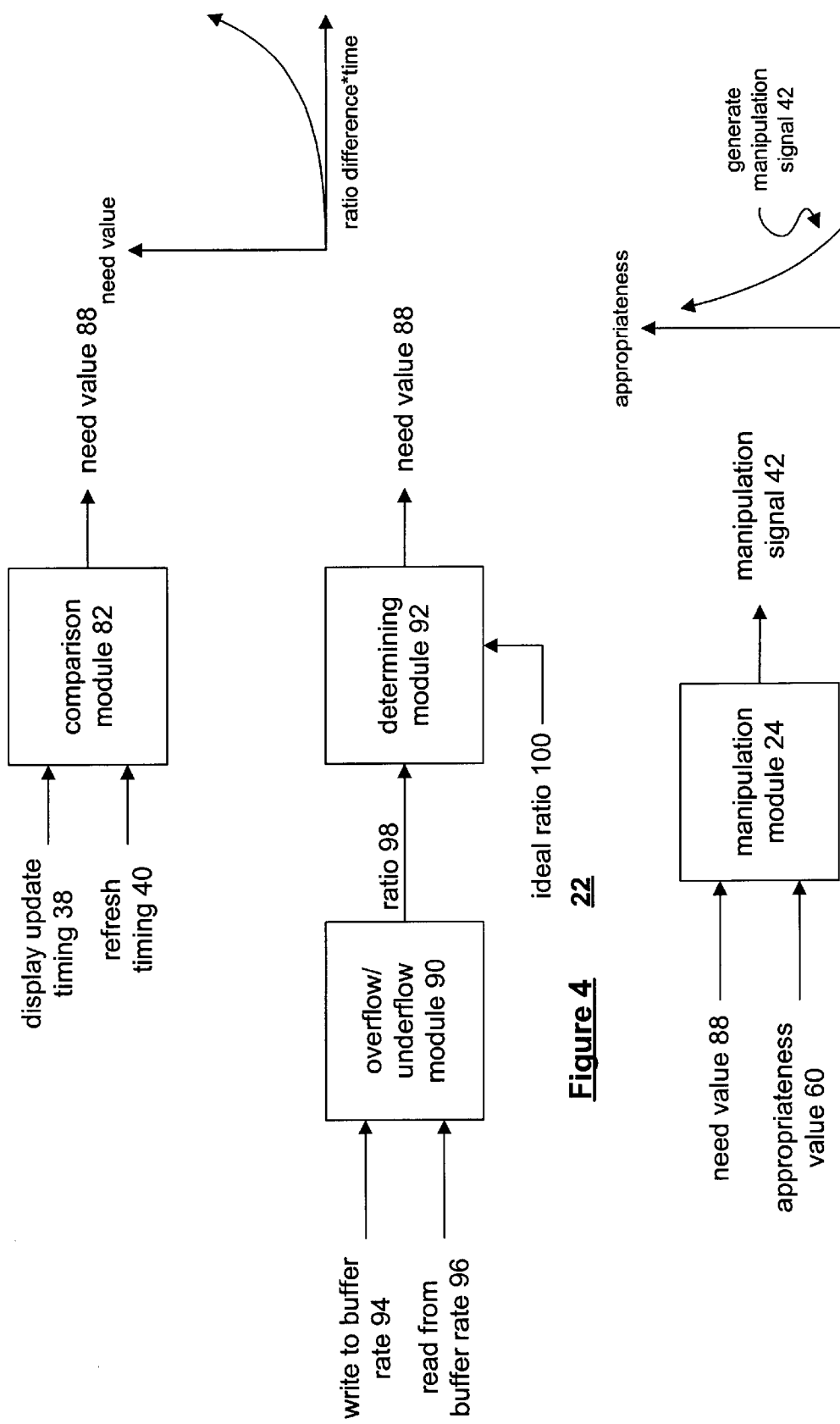
FIG. 4 illustrates schematic block diagrams of the need value module 22 of FIG. 1.

FIG. 4 illustrates schematic block diagrams of the need value module 22. In the first embodiment, the need value module 22 includes a comparison module 82 that is operably coupled to receive display update timing 38 and refresh timing 40. The display update timing 38 includes the frequency and/or phase of the display update rate and the refresh timing 40 includes the frequency and/or phase of the refresh rate. Upon receiving these inputs, the comparison module 82 compares them to produce the need value 88. For example, in the illustration of FIG. 2, the display update rate was 24 hertz, while the refresh rate was 60 hertz. As such, an ideal ratio would be based on these values thereby producing a 2.5 to 1 ideal ratio 86. But, as shown in FIG. 2, the display update rate was not exactly 24 hertz, it was in the neighborhood of 23.9 hertz, thereby producing a ratio slightly less than 2.5 to 1. Based on this difference in the ratio and phase differences between the rates, a mathematical computation may be determined to derive the need value. The mathematical computation may perform the function as shown in the graph which plots the need value versus the ratio difference over time. As such, when the ratio difference is 0, the need value would be 0. As the ratio difference grows over time, the need value increases non-linearly or linearly.

The second embodiment of the need value module 22 includes an overflow/underflow module 90 and a determining module 92. The overflow/underflow module 90 is operably coupled to receive the write to buffer rate and the read to buffer rate 96. Based on these values, the determining module 92 generates a drift value. From this drift value, the need value 88 is derived. In essence, the determining module 92 executes the function to provide the functionality shown in the graph that plots the need value versus ratio difference times time. Such functionality may further be described as a determination to obtain a probable time to an overflow/underflow condition and is based on post drift rate, buffer size and current buffer pointers.

Figure 5:
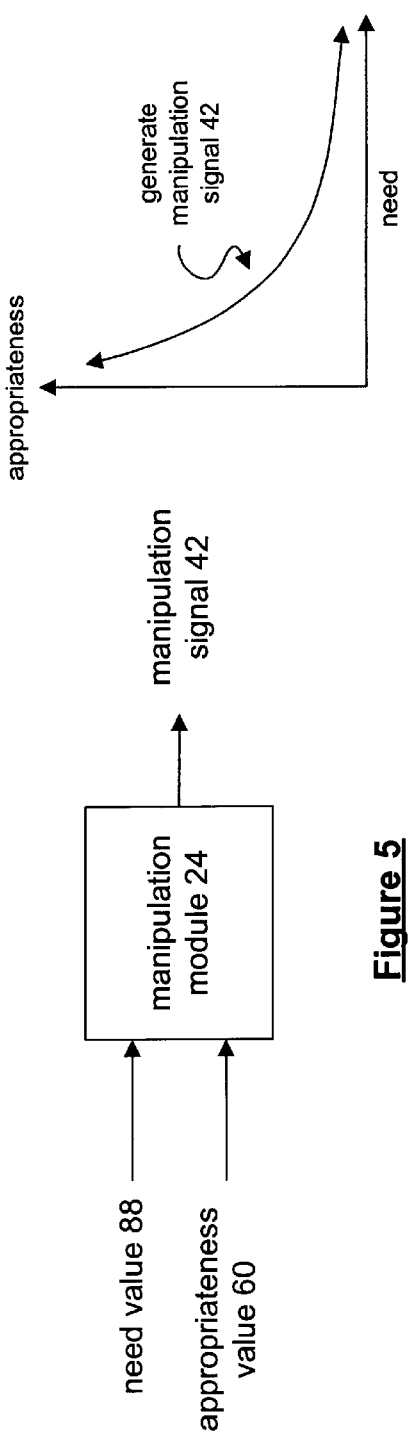
FIG. 5 illustrates a graphical representation of the functionality of the manipulation module 24 of FIG. 1.

FIG. 5 illustrates the manipulation module 24 receiving the need value 88 and the appropriateness value 60. Based on these inputs, the manipulation module 24 generates the manipulation signal 42. As shown in the graph, which plots the appropriateness value versus the need value, when the need is small, the appropriateness threshold to change would be high. As the need increases, the appropriateness threshold correspondingly decreases. As such, when the need is relatively small, the time to make a frame addition or deletion would be a point where there is very little motion and/or a very high likelihood of a scene change. As the need increases, the lack of motion and/or the likelihood of a scene change would decrease. As such, when the need reaches a certain threshold, a change is made regardless of the appropriateness of the change.

Figure 6:
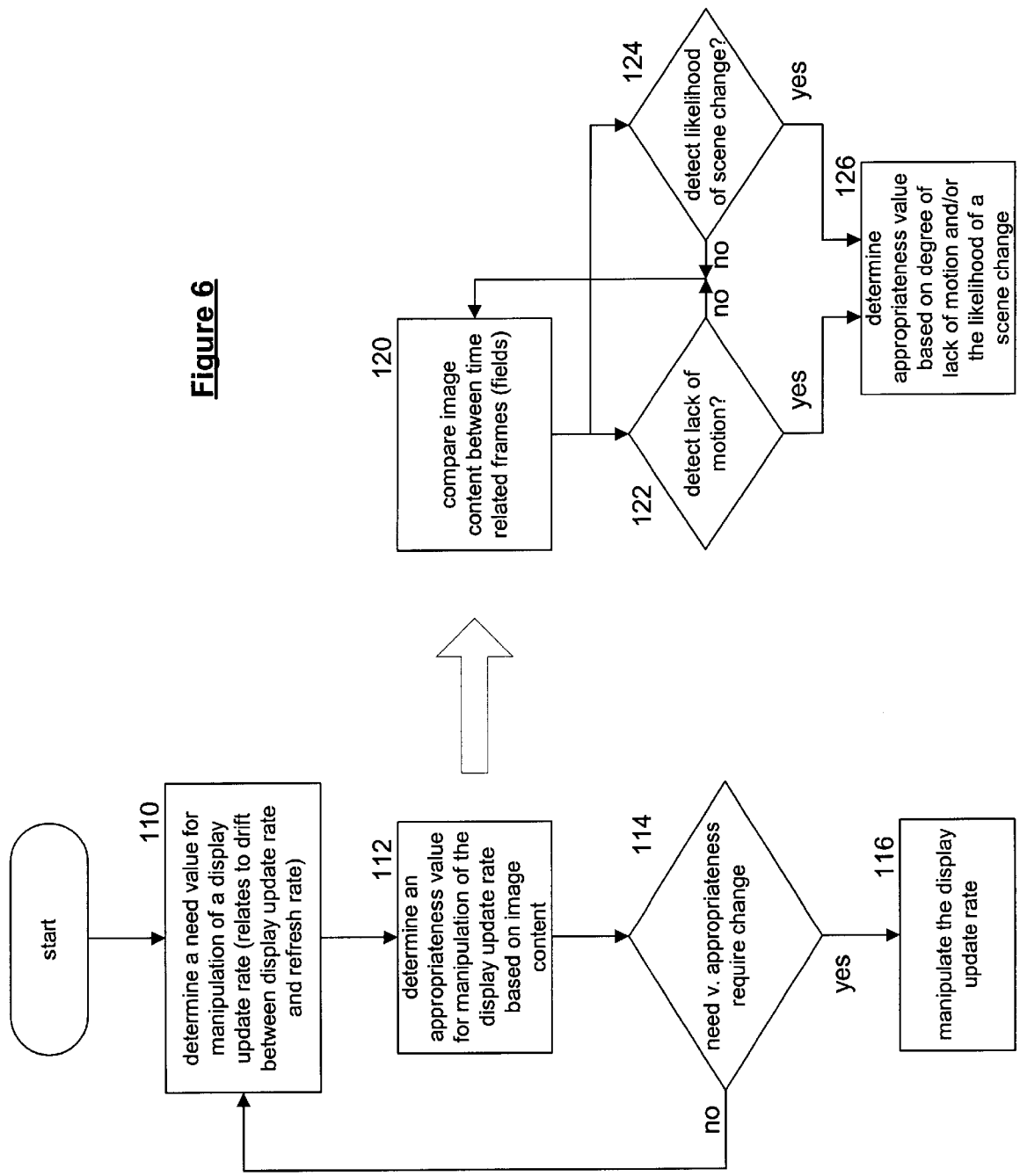
FIG. 6 illustrates a logic diagram of a method for determining an appropriate time for the addition or deletion of frames in accordance with the present invention.

FIG. 6 illustrates a logic diagram of a method for determining the appropriateness for a display update rate change. Note that the process steps of this logic diagram may be executed by a processing module that is reading programming instructions from a memory device. In addition, the programming instructions may be stored on a separate memory device such as a RAM, ROM, floppy disk, hard drive, CD memory, magnetic tape memory, and/or any other device that stores digital information and read by a computer or like processing entity. As an alternative, the programming instructions may further be included in an operating system.

The process begins at step 110 where a need value for manipulation of a display update rate is determined. Such a determination is based on a relationship between the drift between the display update rate and a refresh rate. The drift may be determined based on frame buffer overflow and/or frame buffer underflow. Alternatively, the need value may be determined based on a mathematical computation between the display update rate and the refresh rate. The process then proceeds to step 112 where an appropriateness value for manipulation of the display update rate is determined based on image content.

The process then proceeds to step 114 where a determination is made as to whether the relationship between the need value and appropriateness value requires a display update rate change. If not, the process repeats at step 110. If, however, a change is appropriate, the process proceeds to step 116. At step 116, the display update rate is manipulated. The display update rate may be manipulated by adding at least one frame to the display and/or dropping at least one frame from displaying. Alternatively, the manipulation of the display update rate may be done by adjusting the frame buffer size based on the need value and memory availability. For example, if more than one device is sharing a pool of memory for buffering frames of video data, the frame buffer size may be correspondingly adjusted.

The determination of the appropriateness value is done as shown at steps 120 through 126. At step 120, the image content between time related frames, or fields, are compared. As is generally understood, frames relate to video images being displayed on a composite computer monitor, or the like, where fields relate to images that are being displayed on interlaced type devices. The comparison may be done on MPEG video where the occurrence of an I frame in a non-anticipated position will be utilized to determine the appropriateness value to indicate the likelihood of a scene change. In addition, the motion vectors of the MPEG video would be used to determine a lack of motion between the time related frames.

The process then proceeds to step 122 and 124 where a determination is made as to whether a lack of motion has been detected or a likelihood of scene change has been detected. If neither has been detected, the process repeats at step 120. If, however, one or both have been detected, the process proceeds to step 126. At step 126, the appropriateness value is determined based on the degree of lack of motion and/or the degree of likelihood of a scene change.

The preceding discussion has presented a method and apparatus for determining an appropriate time for adjusting the display update rate (e.g., adding or deleting a frame from display) with minimal or no adverse visual effect. By determining a need value for display update rate change and an appropriateness value for making the change, the display update rate may be changed to produce minimal or no adverse visual effect. As such, once the need for a change has reached a certain level, the appropriateness of a scene change, or lack of motion, dictates when the adding or deleting of a frame is to occur. As such, adding or dropping of a frame occurs in a controlled manner as opposed to the occurrence of an overflow or underflow condition that forced the change in prior embodiments.

What is claimed is:

1. A method for manipulating display update rate, the method comprises the steps of:
   a) determining a need value for manipulation of the display update rate, wherein the need value corresponds to increasing drift caused by discrepancies between the display update rate and a refresh rate, and wherein the display update rate is a rate at which image data is received;
   b) determining an appropriateness value for manipulation of the display update rate based on image content; and
   c) manipulating the display update rate based on a relationship between the need value and the appropriateness value.

2. The method of claim 1, wherein step (b) further comprises:
   comparing the image content between time related frames to determine at least one of: lack of motion between the time related frames and likelihood of scene change between the time related frames; and
   determining the appropriateness value based on at least one of: the lack of motion and the likelihood of scene change.

3. The method of from 2, wherein the comparing is done by at least one of frame signature and direct frame comparison.

4. The method of claim 1, wherein step (b) further comprises:
  determining a likelihood of scene change between frames when an MPEG I frame occurs in a non-anticipated position; and
  determining the appropriateness value based on the likelihood of scene change.

5. The method of claim 1, wherein step (b) further comprises:
  utilizing at least one MPEG motion vector to determine a lack of motion between frames; and
  determining the appropriateness value based on the lack of motion.

6. The method of claim 1, wherein step (a) further comprises determining the increasing drift based on at least one of: frame buffer overflow and frame buffer underflow.

7. The method of claim 6 further comprises adjusting frame buffer size based on the need value and memory availability.

8. The method of claim 1, wherein step (c) further comprises manipulating the display update rate by at least one of: adding at least one frame and dropping at least one frame.

9. The method of claim 1, wherein step (a) further comprises performing a mathematical computation between display update rate and refresh rate to determine the need value.

10. A video graphics circuit comprises:
  a frame buffer operably coupled to store at least one frame of video data;
  a video processor operably coupled to receive video data from a video source, wherein the video processor provides a plurality of frames of the video data to be stored in the frame buffer at a display update rate, such that, at any display cycle, the frame buffer contains the at least one frame of video data;
  a display driver operably coupled to the frame buffer, wherein the display driver retrieves the at least one frame of video data from the frame buffer at a refresh rate; and
  a video rate adjusting module operably coupled to the video processor and the display driver, wherein the video rate adjusting module manipulates the display update rate based on a relationship between the need value and the appropriateness value, wherein the need value corresponds to increasing drift caused by discrepancies between the display update rate and the refresh rate, wherein the appropriateness value is determined based on image content, and wherein the display update rate is a rate at which video data is received from the video source.

11. The video graphics circuit of claim 10, wherein the video rate adjusting module further comprises:
  a comparison module that compares the image content between time related frames of the plurality of frames to determine at least one of: lack of motion between the time related frames and likelihood of scene change between the time related frames; and
  a determining module that determines the appropriateness value based on at least one of: the lack of motion and the likelihood of scene change.

12. The video graphics circuit of claim 10, wherein the video rate adjusting module further comprises:
  a first determining module that determines likelihood of scene change between frames when an MPEG I frame occurs in a non-anticipated position; and
  a second determining module that determines the appropriateness value based on the likelihood of scene change.

13. The video graphics circuit of claim 10, wherein the video rate adjusting module further comprises:
  motion vector module to determine a lack of motion between frames based on at least one MPEG motion vector; and
  determining module that determines the appropriateness value based on the lack of motion.

14. The video graphics circuit of claim 10, wherein the video rate adjusting module further comprises being operably coupled to the frame buffer, such that the video rate adjusting module determines the increasing drift based on at least one of: frame buffer overflow and frame buffer underflow.

15. The video graphics circuit of claim 14 further comprises additional memory operably coupled to the video rate adjusting module, wherein the video rate adjusting module allocates at least portion of the additional memory to increase the size of the frame buffer based on the need value and memory availability of the additional memory.

16. The video graphics circuit of claim 10, wherein the video rate adjusting module further comprises manipulating the display update rate by at least one of: providing a repeat signal such that the at least one frame of video data is read from the frame buffer by the display driver for at least two display cycles and providing a drop signal such that a frame of video data is not provided to the frame buffer.

17. A video rate adjusting module comprises:
  a first module that determines a need value for manipulation of the display update rate, wherein the need value corresponds to increasing drift caused by discrepancies between the display update rate and a refresh rate, and wherein the display update rate is a rate at which image data is received;
  a second module that determines an appropriateness value for manipulation of the display update rate based on image content; and
  a manipulation module that manipulates the display update rate based on a relationship between the need value and the appropriateness value.

18. The video rate adjusting module of claim 17 further comprises:
  a comparison module that compares the image content between time related frames of the plurality of frames to determine at least one of: lack of motion between the time related frames and likelihood of scene change between the time related frames; and
  a determining module that determines the appropriateness value based on at least one of: the lack of motion and the likelihood of scene change.

19. The video rate adjusting module of claim 17 further comprises:
  a first determining module that determines likelihood of scene change between frames when an MPEG I frame occurs in a non-anticipated position; and
  a second determining module that determines the appropriateness value based on the likelihood of scene change.

20. The video rate adjusting module of claim 17 further comprises:
  motion vector module to determine a lack of motion between frames based on at least one MPEG motion vector; and determining module that determines the appropriateness value based on the lack of motion.

21. The video rate adjusting module of claim 17 further comprises being operably coupled to the frame buffer, such that the video rate adjusting module determines the increasing drift based on at least one of: frame buffer overflow and frame buffer underflow.

22. The video rate adjusting module of claim 21 further comprises additional memory operably coupled to the video rate adjusting module, wherein the video rate adjusting module allocates at least portion of the additional memory to increase the size of the frame buffer based on the need value and memory availability of the additional memory.

23. The video rate adjusting module of claim 17 further comprises manipulating the display update rate by at least one of: providing a repeat signal such that the at least one frame of video data is read from the frame buffer by the display driver for at least two display cycles and providing a drop signal such that a frame of video data is not provided to the frame buffer.

24. A digital storage medium for storing programming instructions, wherein, when a processing unit executes the programming instructions, the processing unit manipulates a display update rate, the digital storage medium comprises:

a first storage means for storing programming instructions that cause the processing unit to determine a need value for manipulation of the display update rate, wherein the need value corresponds to increasing drift caused by discrepancies between the display update rate and a refresh rate, and wherein the display update rate is a rate at which image data is received;

a second storage means for storing programming instructions that cause the processing unit to determine an appropriateness value for manipulation of the display update rate based on image content; and a third storage means for storing programming instructions that cause the processing unit to manipulate the display update rate based on a relationship between the need value and the appropriateness value.

25. The digital storage medium of claim 24, further comprises programming instructions that cause the processing unit to:

compare the image content between time related frames to determine at least one of: lack of motion between the time related frames and likelihood of scene change between the time related frames; and determine the appropriateness value based on at least one of: the lack of motion and the likelihood of scene change.

26. The digital storage medium of claim 24, further comprises programming instructions that cause the processing unit to:

determine a likelihood of scene change between frames when an MPEG I frame occurs in a non-anticipated position; and determine the appropriateness value based on the likelihood of scene change.

27. The digital storage medium of claim 24, further comprises programming instructions that cause the processing unit to:

utilize at least one MPEG motion vector to determine a lack of motion between frames; and determine the appropriateness value based on the lack of motion.

* * * * *